United States Patent

[11] 3,588,237

| | | | | | | |
|---|---|---|---|---|---|---|
| [72] | Inventor | John A. Aldrich<br>Lutherville, Md. | | 2,442,240 | 5/1948 | Hooker et al. ................ 35/25X |
| [21] | Appl. No. | 796,693 | | 2,445,982 | 7/1948 | Waller et al. ................ 352/39X |
| [22] | Filed | Feb. 5, 1969 | | 2,795,057 | 6/1957 | Sohn ............................ 273/105.1X |
| [45] | Patented | June 28, 1971 | | 3,339,293 | 9/1967 | Kuhlo et al. ................ 35/25 |
| [73] | Assignee | The United States of America as represented by the Secretary of the Navy | | 3,422,548 | 1/1969 | Waldhauer .................. 35/25 |

Primary Examiner—Louis R. Prince
Assistant Examiner—Frederick Shoon
Attorneys—Joseph C. Warfield, John W. Pease and Harvey A. David

[54] MOVING TARGET SIMULATOR
6 Claims, 4 Drawing Figs.

[52] U.S. Cl................................................. 352/39,
35/25, 273/101.2, 273/105.1, 352/39, 352/131
[51] Int. Cl................................................. F41j 5/08,
F41j 9/14, G03b 21/52
[50] Field of Search........................................ 352/39,
131, 92; 273/105.1, 101.2; 35/25

[56] References Cited
UNITED STATES PATENTS
2,406,574  8/1946  Waller et al. .................. 273/105.1X ABSTRACT: Apparatus is described for training personnel in the aiming and launching of a shoulder fired anti-aircraft weapon. The apparatus comprises a curved screen, film projection apparatus for projecting an aircraft image in proper attitude throughout a trajectory determined by data coded on the film and converted by decoding means to commands for moving a projection beam deflecting gimballed mirror in the projection apparatus. Target infrared emission is simulated by means for generating and mixing infrared energy with the projection beam.

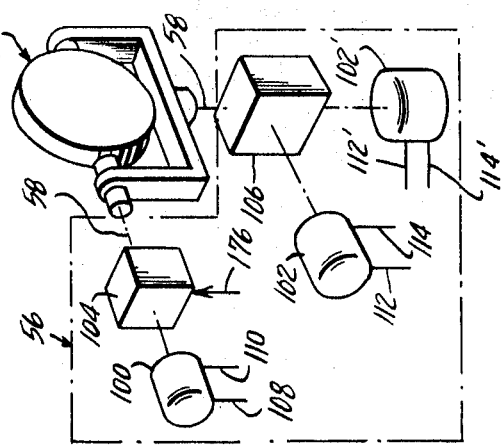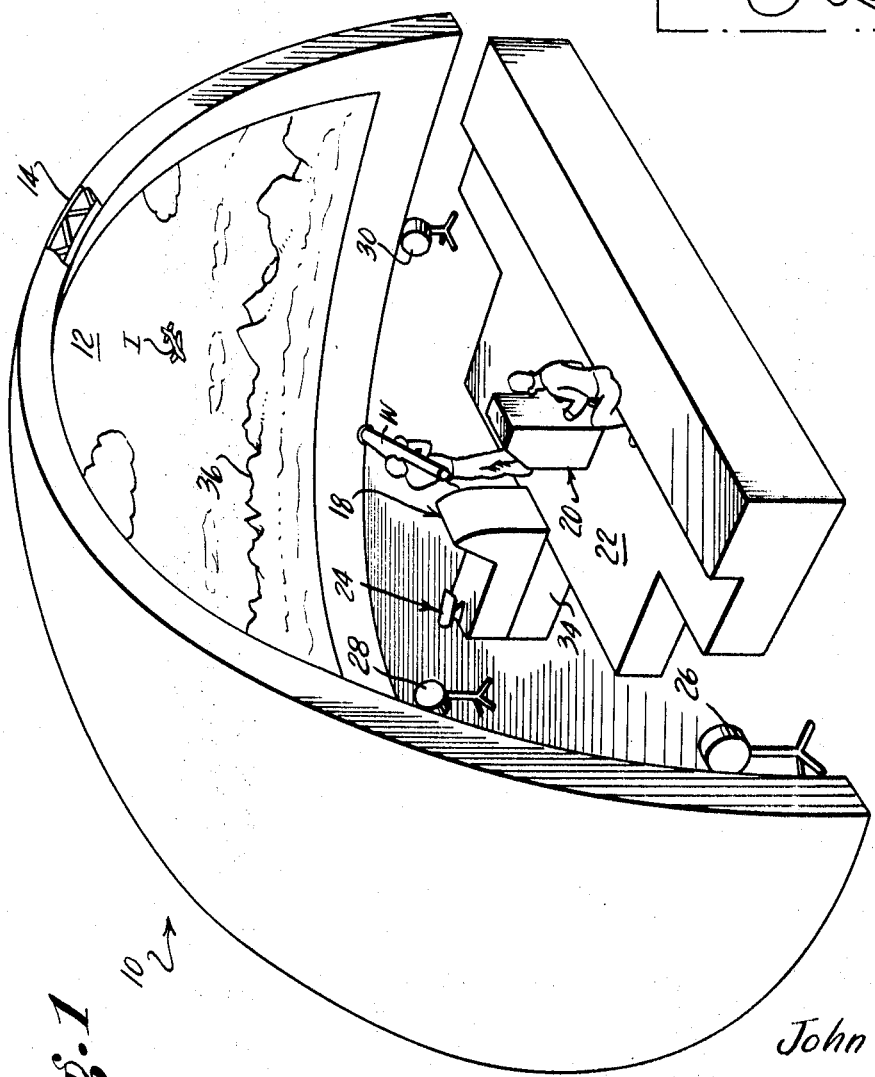
John A. Aldrich
INVENTOR.

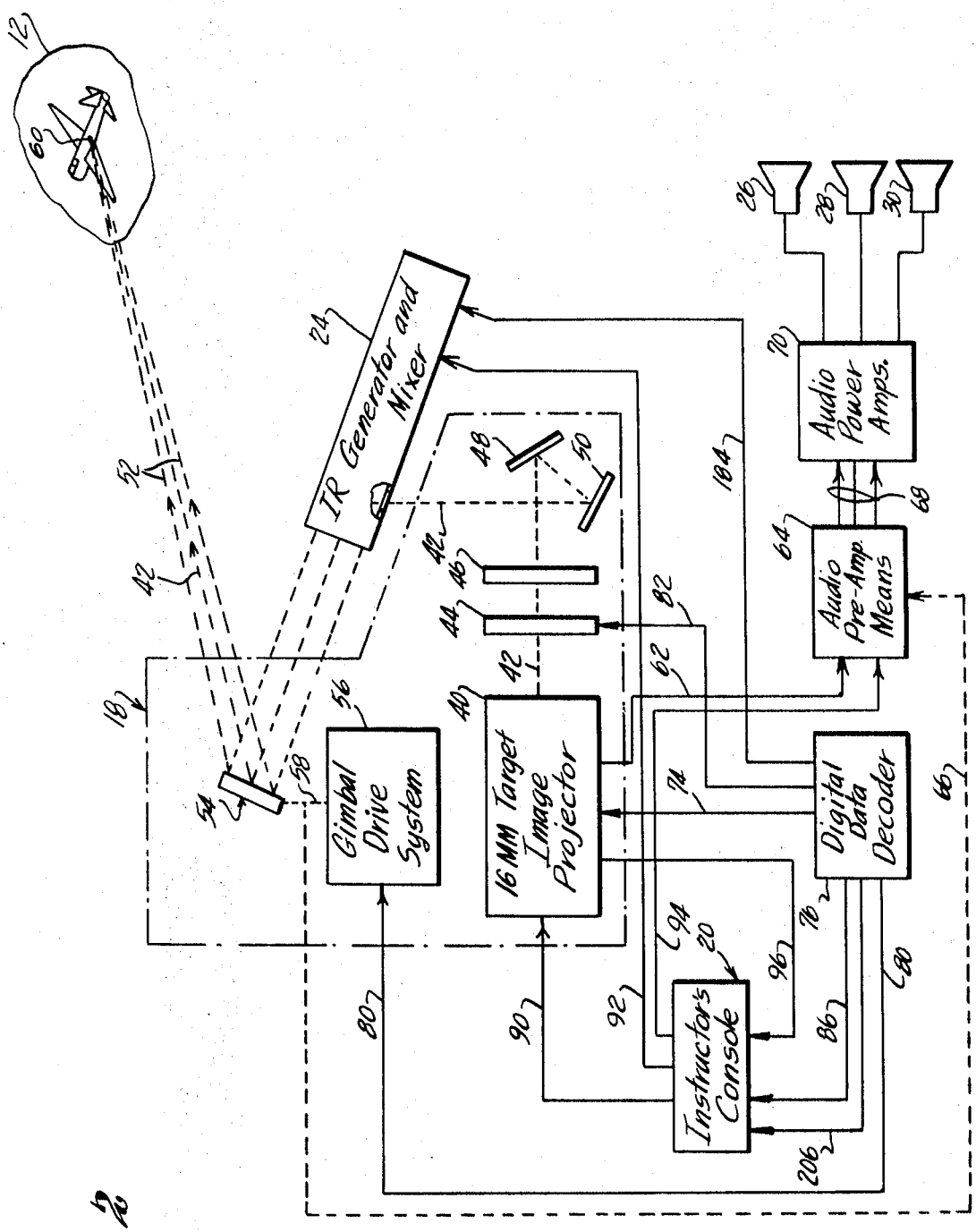

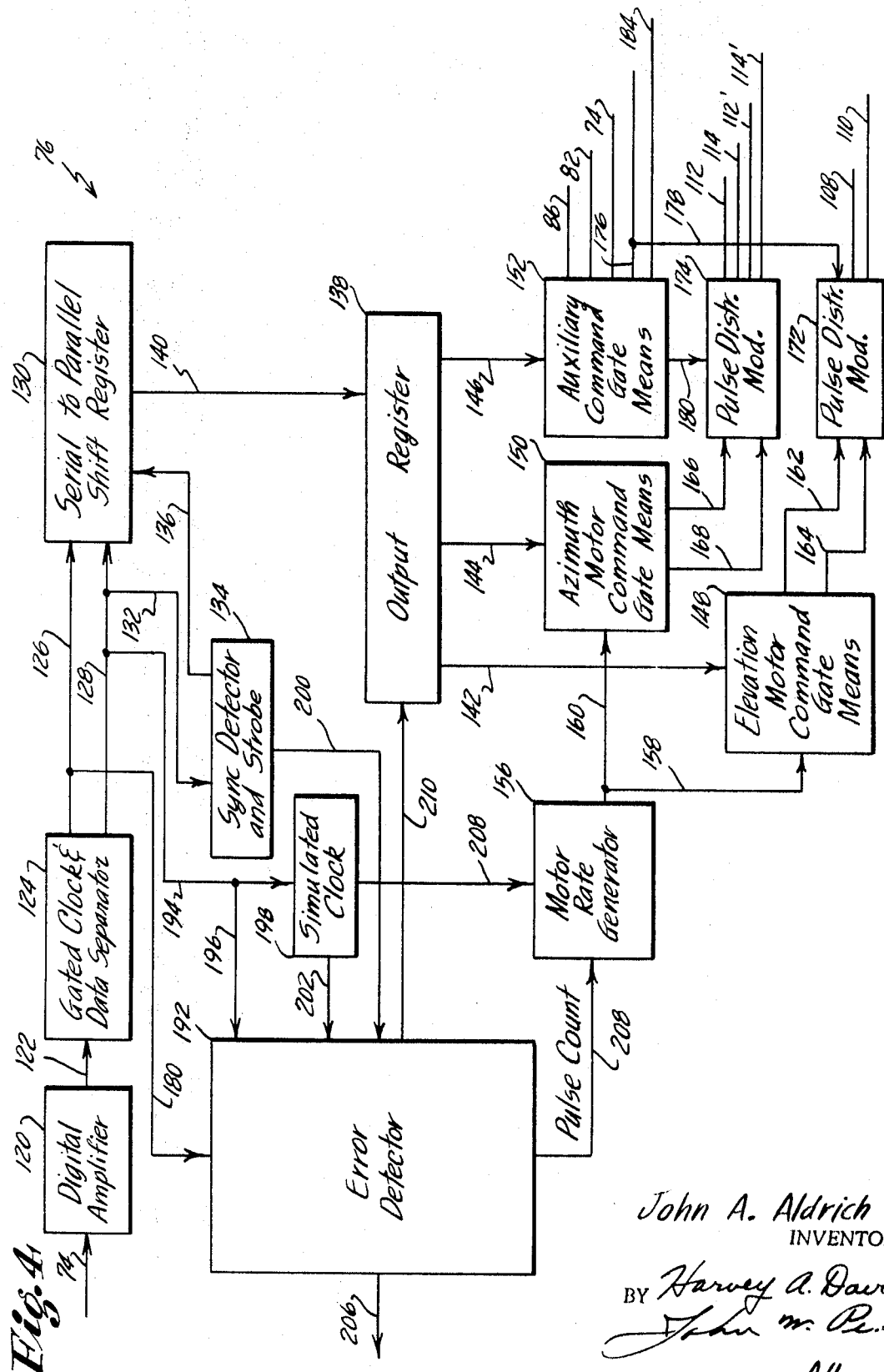

3,588,237

1

MOVING TARGET SIMULATOR

BACKGROUND OF THE INVENTION

This invention relates to training devices and more particularly to apparatus useful in training personnel in the aiming of a shoulder held anti-aircraft weapon. The type of weapon concerned launches a heat or infrared seeking missile which is effective against low flying aircraft. Proper aiming of the weapon requires practice in target acquisition and tracking, which skills involve estimating proper lead and anticipation of the trajectory which the aircraft will follow. Because the procedures involved in readying and firing such a weapon are time dependent, that is to say each procedure must be done in a given sequence and within time limits established for example by the short effective life of a thermal battery element, adequate familiarization training is important. With respect to one typical weapon, the trainee must learn how to judge when to activate the weapon circuits, to position the target in the sight reticle very quickly, uncage a gyro and wait for it to stabilize, quickly introduce superelevation and lead angles, squeeze the trigger at the appropriate moment, and hold steady on the target point for a predetermined minimum time after firing.

Proficiency training consists of providing the trainee with the opportunity to develop and exercise skill in operating the device. The trainee must learn to take advantage of the available cues in his environment and to anticipate the effect of different factors on the effectiveness of his operations. For example, the operator might hear an enemy aircraft before he sees the target. By taking advantage of this forewarning, he can prepare himself and his weapon for the moment when he does see it. With proper training the operator can learn to anticipate target course and to determine the possibility of obstructions such as trees or hills interfering with his launch. Taking such factors into account and properly responding to them can only be taught by practicing in a highly realistic and varied environment. Therefore, it is essential that dynamic visual and IR target characteristics are available for practice in a number of different tactical settings.

BRIEF SUMMARY OF THE INVENTION

With the foregoing in mind, it is a principal object of this invention to provide simulation or training apparatus which provides a projected image of a low flying aircraft, which image is caused to follow any one of a number of predetermined realistic trajectories across a curved projection screen whereby a trainee may practice target acquisition and tracking with the sights of a shoulder fired weapon.

Another object of the invention is the provision of a simulation apparatus of the foregoing character which provides a target image which is characterized by a component of reflected infrared light energy, whereby a simulated weapon having infrared sensitive components, for example within the sighting or scoring means, will respond to the target image in the same manner as if an actual infrared emitting target were being tracked.

As another object, this invention aims to provide a simulation apparatus of the foregoing character and which further comprises means for generating sound representation of a target aircraft, synchronized with the image trajectory whereby a trainee may learn to be aurally alerted to the approach of a low flying aircraft before visual detection thereof. The trainee also derives aural cues as to the direction of target travel and range of the target. The sonic representation feature provides the apparatus with a high degree of realism which reinforces the learning process.

These and other objects and advantages of simulation apparatus embodying the present invention will become apparent from the following detailed description when read in conjunction with the accompanying sheets of drawings forming a part of this specification.

2

IN THE DRAWINGS

FIG. 1 is a perspective view illustrating a training apparatus embodying the present invention;

FIG. 2 is a diagrammatic illustration, in block form, of the apparatus of FIG. 1;

FIG. 3 is a diagrammatic illustration in more detail of the mirror drive portion of the apparatus; and FIG. 4 is a more detailed diagrammatic illustration, in block form, of the digital data decoder portion of the apparatus.

DESCRIPTION OF THE PREFERRED EMBODIMENT

In the form of the invention illustrated in the drawings and described hereinafter, there is provided a simulation apparatus generally indicated at 10 and comprising a spherically curved projection screen 12 on the inner surface of a suitable support structure 14. In the present embodiment the screen 12 provides a display area of 180° in azimuth and 90° in elevation. The apparatus 10 includes a target image projection system, generally indicated at 18 and located substantially at the center of curvature of the screen 12. The projection system, later described in more detail, serves to project an image I of a low flying aircraft on the screen 12 and to cause the image to follow realistic trajectories across the screen while changing the image as necessary to present a realistic appearance of aircraft attitude. The target program may be selected by an instructor through the use of a control console 20 which is mounted on a platform 22.

A student or trainee T may stand on the platform 22 between the projection means 18 and the control console 20, from which position he can view the screen 12 and practice firing a simulated weapon W at the target image I.

In addition to a target image projection system 18, the apparatus comprises a IF (infrared) generator and mixer, which is generally indicated at 24 and is described in more detail in copending patent application Ser. No. 806,225, filed Mar. 11, 1969. The IF generator and mixer 24 superposes a beam of infrared energy on the target image I so that infrared energy is reflected from the screen 12 in simulation of the infrared energy normally emanating from an aircraft. This reflected infrared energy is usable by the weapon simulator W in a known manner to initiate the recording of a hit if the weapon is properly aimed at the time the trigger is squeezed, and proper aim is maintained for a predetermined time period thereafter.

To further enhance the realism and effectiveness of the apparatus 10 in training personnel, the apparatus comprises a binaural sound system including two or more speakers such as 26, 28, and 30, which produce the sound of an aircraft as it approaches and passes, thereby giving directional and range cues to the trainee. The binaural or stereo sound may be derived from a plurality of sound tracks on the film of the projector about to be discussed, or from a preferred single track stereo sound system, details of which are provided in copending patent application, Ser. No. 801,055, filed Feb. 20, 1969.

Additional projection means is provided in the form of a panoramic projector 34 which serves to project background scenery or landscape 36 which may include hills, buildings, trees, and the like. The background serves to aid the trainee in orienting, tracking and gaining an appreciation of the limited time in which low flying aircraft present themselves as targets in areas having hills and trees.

Referring now to FIG. 2, the projector system 18 is seen to comprise a target image projector 40 in which the present example is a conventional 16 mm. motion picture film projector.

The projector 40 directs an image projection beam 42 through a solenoid shutter 44, neutral density filter means 46, for reflection by mirror means 48, 50 into the infrared generator and mixer 24 from which the beam 42 emerges together with an infrared beam 52. The beams 42 and 52 are reflected by a gimballed mirror 54 onto the curved screen 12.

The gimballed mirror 54 is positionable about vertical and horizontal axes by a gimballed mirror drive system 56 having mechanical connection 58 with the mirror, to cause the target image formed by beam 42, and a coincident infrared spot 60 formed by beam 52, to traverse the screen 12 in azimuth and/or elevation.

The projector 40 has sound track or stripe reading capability as well as the capability of reading digital data coded on an additional stripe on the film. The sound readout is in the form of electrical signals which are conducted as shown by flow line 62 to audio preamplifier means 64 and is utilized to produce binaural or stereo sound effects coordinated with the trajectory and simulated range of a target image I.

To this end, and as is described in more detail in copending application Ser. No. 801,055, filed Feb. 20, 1969, and assigned to a common assignee herewith, the audio preamplifier means 64 receive a mechanical input from the gimbal drive system 56 as shown by the dotted line 66. This mechanical input is utilized to vary the output of the preamplifier means 64 to audio power amplifiers 70 via lines 68, and hence the outputs of the speakers 26, 28, 30 in accordance with movement of a target image I along a trajectory determined by a target trajectory program recorded on the particular film being projected by the projection system 18.

The recording of the target trajectory program is in the form of a stripe on the film similar to the sound recording, but in the present embodiment is in digital form. The projector 40 includes means for reading the target trajectory program and provides an electrical output consisting of pulse signals via line 74 to a digital data decoder 76.

The digital data decoder converts the pulse signals derived from the film stripe into azimuth and elevation commands which are applied, as shown by flow line 80, to the gimbal drive 56 for positioning of the mirror 54. In addition, digital data decoder converts the pulse signals into solenoid shutter actuating commands via line 82, into infrared on or off commands via line 184, and into instructor monitoring signals as shown by line 86 to the console 20.

The instructor may control operation of the projector 40, the infrared generator and mixer 24, and the audio level from the console 20 as indicated by lines 90, 92, and 94, respectively. The status of film footage is monitored at the console 20, the footage signals being passed from the projector 40 to the console 20 as shown by line 96.

The gimbal drive system 56 for the mirror 54 comprises an elevation drive motor 100 (FIG. 3) and coarse and fine azimuth drive motors 102 and 102'. These motors are of the pulse responsive type which produce predetermined increments of rotation of the output shaft thereof for each electrical pulse input. In the present example, the elevation drive motor 100 is connected to the gimballed mirror 54 through gearing or other transmission means 104, the ratio of which may be changed on suitable commands to vary the rate of movement of the mirror with respect to the drive motor. Suitable transmission means such as a differential 106 connects the coarse and fine motors 102, 102' to the mirror.

The motors 100, 101, 102 are reversible in direction. Thus, pulses applied at line 108 to the elevation drive motor 100 will cause the mirror 54 to move the image I up, whereas pulses applied to line 110 will cause the image I to be moved down. Similarly, pulses applied to lines 112, 112' serving the azimuth drive motors 102, 102' will cause the mirror 54 to move the image I clockwise, whereas application of pulses to lines 114, 114' will effect movement of the image counterclockwise.

The elevation and azimuth drive pulses are derived by the digital data decoder 76 from the target image position data read from the film stripe and passed to the decoder as shown by line 74.

Referring now to FIG. 4, the digital data decoder 76 comprises a digital amplifier 120 which amplifies the coded train of pulses received from an appropriate reading head, such as a magnetic pickup in the projector. The amplified pulse train comprises both data and clock pulse information and is passed via line 122 to a gated lock and data separator 124. The latter separates the pulse train into data pulses and clock pulses which are applied as shown by lines 126 and 128 to a serial to parallel shift register 130. The data pulses represent bits of information in a code word format wherein a plurality of bit positions (say 12) are available. That is to say, the presence or absence of a data pulse at a bit position is indicative of certain information. Also combinations of such presence or absence at a plurality bit position may be indicative of certain information. The clock pulses step the pulses or bits along the shift register until a complete word is stored therein, the end of a word being conveniently indicated by the absence of a clock pulse. The clock pulses are received, as shown by line 132, by a sync detector and strobe generator 134 which is responsive to the end of the word to strobe the shift register via line 136 which converts the data to parallel form and transfers it to an output register 138 as indicated by flow line 140. The shift register 130 is then reset to receive the next data word by a reset pulse from the strobe generator.

Azimuth and elevation motor command bits that are strobed from the shift register 130 are stored in the output register 138 wherein the commands are decoded and maintained for the duration of the following word.

The decoded command data maintained by the output register is applied as shown by flow lines 142, 144, and 146 to elevation motor command gate means 148, azimuth motor command gate means 150, and auxiliary command gate means 152, respectively. Decoded elevation and azimuth command data from the output register 138 is ANDED in the elevation motor command gate means 148 and in the azimuth motor command gate means 150, respectively, with motor rate pulses generated at a plurality of frequencies by a motor rate generator 156, the flow of pulses from the rate generator being collectively represented by lines 158, 160.

The result is to provide on one or the other of lines 162, 164 from the elevation gate means 148 a string of pulses the frequency of which will determine the rate of operation of the elevation drive motor 100 during a given word duration, the operation being to drive the mirror up if the pulses are on line 162 and down if on the line 164.

Similarly, the azimuth gate means 150 passes pulses to line 166, the frequency of which will govern clockwise drive of the appropriate motor 101 or 102 as will presently be made apparent.

Because the pulse frequencies on lines 162, 164, and 166, 168 will vary from word to word, sometimes in a cyclical manner, the drive of the gimballed mirror 54 would at times be jerky or subject to resonant frequency oscillation if the drive motors were responsive directly to the outputs of the command gate means 148 and 150. Accordingly, there are provided pulse distribution modifiers 172 and 174 which have the effect of "smoothing" the pulse frequencies by tending to average them from word to word. The manner in which this is accomplished by the pulse distribution modifiers is described in copending application Ser. No. 807,226, filed Mar. 14, 1969.

The modifier 172 is responsive to gear changing commands from the means 152 via lines 176, 178 to provide pulses on line 108 which are appropriate to the ratio of the transmission means 104. Similarly, the distribution modifier 174 is responsive to an auxiliary command via line 180 from the means 152 to provide appropriate direction of pulses on lines 112, 114, 112', 114' for the coarse and fine azimuth drive motors 102, 102'.

The auxiliary command gate means distributes other commands decoded and maintained for each word length by the output register 138 such as a launch boundary command on line 86 which provides an indication on the instructor's console 20 when the simulated target is within firing range, and a shutter command on line 82 which actuates the solenoid shutter to blank the image I when it would be occluded as by tree tops, a mountain peak, or the like. Other auxiliary commands include projector start and stop commands via line 74 to the projector 40, and an infrared "on" command via line 184 to the infrared generator and mixer 24.

In order to insure accurate and consistent operation of the apparatus irrespective of some errors or omissions in the reading of trajectory, auxiliary command data and clock pulses from the film stripes, separation of the data, etc., the apparatus comprises error detection means. Thus, the separated data pulses on line 126 are conveyed as shown by line 190 to an error detector 192, while clock pulses are conveyed via lines 194, 196 to the error detector and to a simulated clock pulse generator 198.

Error detection for the decoding logic is accomplished in the detector 192 through the use of even parity. To this end one of the data bits in each word constitutes a parity bit. If the code bits plus the parity bit add to an even number in the detector 192, no error is recorded thereby. In addition to errors that might occur in the data bits, provision is also included to record as an error any time a pulse in the gated clock pulse train is missing that shouldn't be. This is done by counting the gated clock pulses between the generated strobe pulses and comparing the result to the proper number. Thus, the outputs shown as lines 200 and 202 from the strobe generator 134 and the simulated clock 198 are applied to the error detector. The two types of errors (data and clock) are accumulated, and when a predetermined number, say 16, have occurred a malfunction signal is sent as shown by line 206 to initiate a visual malfunction indication.

The simulated clock pulse generator 198 is a synchronized oscillator that receives its synchronizing from the decoded clock pulses. The motor rate generator is normally responsive to the decoded clock pulse count applied thereto as shown by line 208, however when a clock pulse is missing, the simulated clock fills in a pulse so that the motor rate generator operation will be maintained and no error need be detected. If the decoded clock pulse train does not break up, no parity errors exist, and the synchronizing pulse is detected. When no error is detected, the error detector resets the output register 138 as shown by line 210. The data from the shift register 130 is then transferred into the output register as previously described.

If an error is detected, the output register 138 is not reset and the data from the previous word is maintained and used again.

I claim:

1. Apparatus comprising:
    a projection screen;
    a projection system including a motion picture film projector for projecting on said screen an image forming beam, and including a mirror mounted for movement in elevation and azimuth to deflect said beam so as to cause said image to traverse said screen;
    said projector including data reading means for detecting digital clock and command data recorded on said film and for providing signals corresponding thereto as an output;
    digital data decoding means responsive to said reading means output and operative to convert a portion of said data to elevation command signals and azimuth command signals;
    mirror drive means connected to said mirror and responsive to said azimuth command signals and to said elevation command signals to effect said movement of said mirror; and
    infrared generating and mixing means mounted to receive said image forming beam between said projector and said mirror and to combine therewith a converging beam of infrared energy coaxial with said image forming beam.

2. Apparatus as defined in claim 1, and wherein said digital data decoding means comprises:
    data separator means connected to receive the output of said data reading means and operative to separate clock pulses from said data;
    strobe means responsive to said clock pulses to generate strobe signals corresponding to a predetermined word length;
    shift register means connected to receive said clock pulses and to receive command data pulses as information bits from said separator means, and operative in response to said strobe signals to convert command data for a predetermined word length from serial to parallel bit data wherein predetermined bit positions within each word represent elevation, azimuth and auxiliary commands;
    output register means for receiving and storing said parallel bit data;
    a motor rate pulse generator operative to provide motor drive pulses at a plurality of frequencies; and
    elevation and azimuth gate means connected to said output register means and to said motor rate generator and operative to provide elevation and azimuth commands to said mirror drive means.

3. Apparatus as defined in claim 2, and wherein said digital date decoding means further comprises:
    error detection means connected to receive data output from said separator means, said detection means being operative to detect differences from a predetermined parity value and to provide an output representative of an existing error in a data word;
    said output register being responsive to the output of said error detection means to maintain the existing word commands when an error is detected in the following data word.

4. Apparatus as defined in claim 2, and further comprising:
    sound track reading means in said projector for providing a sound representative output;
    stereo sound reproduction means comprising a plurality of loudspeaker means and responsive to said output of said sound track reading means to produce stereo sound coordinated with the trajectory of said image.

5. Apparatus as defined in claim 4, and wherein said digital data decoding means further comprises:
    error detection means connected to receive data output from said separator means, said detection means being operative to detect differences from a predetermined parity value and to provide an output representative of an existing error in a data word;
    said output register being responsive to the output of said error detection means to maintain the existing word commands when an error is detected in the following data word.

6. Apparatus as defined in claim 5, and wherein said digital data decoding means further comprises:
    a synthetic clock pulse generator connected to receive said clock pulses and operative to supply a synthetic clock pulse to said motor rate generator in the absence of a clock pulse in the clock pulse output of said separator means.